United States Patent [19]

Cota et al.

[11] Patent Number: 5,357,410

[45] Date of Patent: Oct. 18, 1994

[54] LIGHTED FISHING POLE

[76] Inventors: Michael J. Cota; Anthony J. Cota, both of 5493 Domino Ave., Santa Maria, Calif. 93455

[21] Appl. No.: 125,665

[22] Filed: Sep. 23, 1993

[51] Int. Cl.[5] .................... A01K 87/00; F21V 33/00
[52] U.S. Cl. .................... 362/109; 43/17.5; 362/802
[58] Field of Search ............... 362/109, 802, 32, 190, 362/191, 253; 43/17, 17.5

[56] References Cited

U.S. PATENT DOCUMENTS

| | | | |
|---|---|---|---|
| 3,882,629 | 5/1975 | Kaye | 43/17 |
| 4,026,059 | 5/1977 | Ochs | 43/17.5 |
| 4,085,437 | 4/1978 | Hrdlicks et al. | 362/109 |
| 4,479,321 | 10/1984 | Welstead | 43/17 |
| 4,479,321 | 10/1984 | Welstead | 43/17 |
| 4,535,392 | 8/1985 | Montgomery | 362/191 |
| 5,172,508 | 12/1992 | Schmidt et al. | 43/17.5 |

FOREIGN PATENT DOCUMENTS 2052231 1/1981 United Kingdom .

*Primary Examiner*—Ira S. Lazarus
*Assistant Examiner*—Sara Raab
*Attorney, Agent, or Firm*—Jack C. Munro

[57] ABSTRACT

A fishing pole where the outermost section of the fishing pole is capable of being illuminated. The illumination of the outermost section is to be selectable by the user to not be illuminated, be illuminated continuously or to be illuminated only when the outermost section of the rod of the fishing pole is jerked which occurs when a fish is attempting to take the bait which is connected at the outer end of the fishing line.

3 Claims, 1 Drawing Sheet

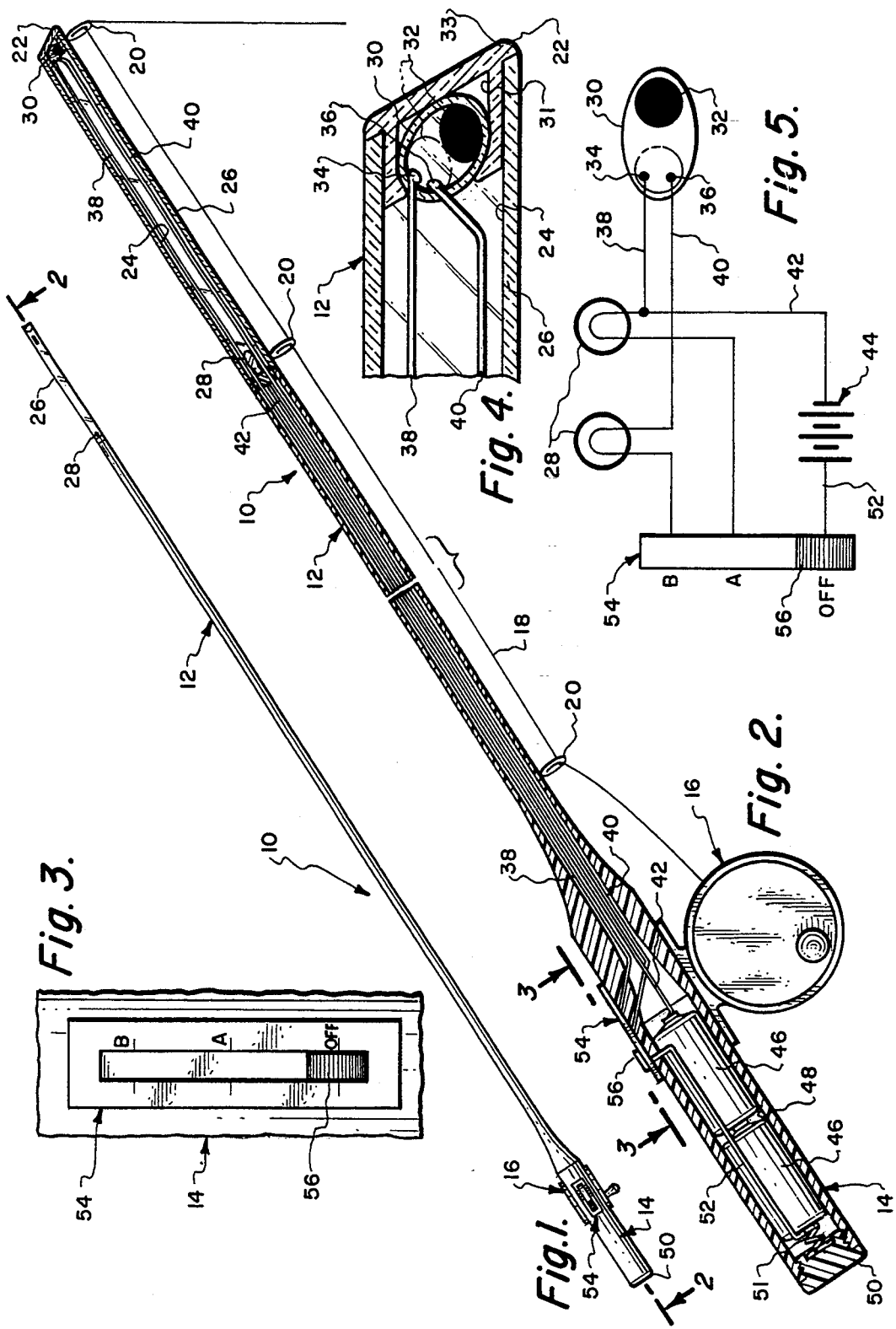

LIGHTED FISHING POLE

BACKGROUND OF THE INVENTION

1) Field of the Invention

This invention relates to the illuminating the outermost section of the bendable rod of a fishing rod for use by fishermen in observing of the outermost section of the rod of the fishing pole when fishing is occurring at night so that the fisherman is able to observe when a fish is attempting to take the bait.

2) Description of the Prior Art

Fishing is the largest outdoor recreational sport. Typically fishing is accomplished by the use of a fishing pole which includes a rod, a reel, and a line. The line is wound and stored on the reel with the reel being mounted on the handle portion of the rod. The fishing line is conducted through eyelets mounted on the rod and then exteriorly of the fishing pole with the outer end of the line being connected to a hook. The hook is then baited with the bait and cast or placed within the water. The fisherman then waits until he perceives that a fish is attempting to take the bait with this being detected by the fisherman when the outermost end of the fishing rod is being jerked. The fisherman is to watch this outermost end of the rod and at an appropriate time when the fisherman thinks that the fish has "taken the bait", the fisherman then is to jerk the rod in a direction out of the water which hopefully will result in the hook being set within the fish so that the fish can then be caught.

Many fish feed primarily between sunset and sunrise. Many fishermen thereby fish at night. Most of the time it is very difficult or impossible to see the end of the fishing rod. Therefore, the fisherman is not able to see if a fish is attempting to take the bait and is not able to jerk the rod at the correct time in order to set the hook.

In the past, there have been constructed illumination devices in conjunction with fishing poles. However, in the past, these illuminating devices have been bulky and complex in construction and were mounted on the exterior surface of the fishing pole. Therefore, these illuminating devices were subject to being damaged during normal transport of the fishing pole to the fishing location. Also, other illuminating devices for fishing poles either require only the illuminating device to be on or off. If the illuminating device is totally on, the battery power associated with the device is normally not sufficient to illuminate the fishing pole for several hours.

SUMMARY OF THE INVENTION

The structure of the present invention takes the form of conventional fishing pole which comprises a bendable elongated rod, the lower end of which is formed into a handle with eyelets in a spaced apart relationship on the upper bendable portion of the rod. A reel is mounted on the handle and within the reel is located an extended length of fishing line. The fishing line is to be conducted through the eyelets and then exteriorly to a hook which in turn has bait placed thereon and which is placed in the water and fishing is to occur. The present invention provides for the including within the handle of a battery arrangement. The outermost section of the pole is formed to be either translucent or transparent. Directly adjacent this outermost section and embedded within the rod is a light source. At the free end, which is the outer end, of the outermost section there is mounted in an embedded relationship a movement actuatable switch such as a mercury switch. The mercury switch, the light source and the battery is all connected to a three-position switch which is mounted on the handle. The first position of the switch is the off position which provides for continuous deactivation of the light source. The second position provides for sporadic activation of the light source such as is to occur when the fish is about to be hooked and a jerking motion is imparted to the rod with the light source to then be activated. The third position of the switch will cause the light source to be continuously activated.

The primary objective of the present invention provides a lighted fishing pole with an illumination means embedded within the rod of the fishing pole for use by a fisherman when fishing at night.

Another objective of the present invention is to construct a lighted fishing pole where the lighting structure is embedded within the body of the pole thereby not subject to damage during normal transport of the fishing pole.

A further objective of the present invention is to construct a lighted fishing pole where the fisherman has the capability of selecting sporadic illumination of a portion of the fishing rod for continuous illumination.

A still further advantage of the present invention is to provide a lighted fishing pole which is simple in construction and which may be manufactured at an economical cost so as to encourage widespread usage thereof by fishermen.

BRIEF DESCRIPTION OF THE DRAWING

FIG. 1 is an exterior view of the fishing pole of the present invention;

FIG. 2 is a side elevational view of the lighted fishing pole of the present invention taken along line 2—2 of FIG. 1 showing the fishing rod broken away, depicting only the outermost section and the handle of the rod;

FIG. 3 is a plan view of the three-position switch which is mounted on the handle of the fishing pole of the present invention;

FIG. 4 is an enlarged segmental view of the tip of the rod of the fishing pole of FIG. 2; and FIG. 5 is an electrical schematic view of the circuit that is utilized to achieve the illumination of the outermost section of the rod of the fishing pole.

DETAILED DESCRIPTION OF THE SHOWN EMBODIMENT

Referring particularly to the drawing there is shown a lighted fishing pole 10 of this invention which comprises generally a bendable rod 12 which is connected at its aft end to a handle section 14 and reel 16 and fishing line 18. The fishing line 18 is to be wound on a reel 16 and is adapted to be dispensed therefrom through eyelets 20. The eyelets 20 are mounted in a spaced apart manner on the bendable rod 12 generally from the handle section 14 all the way to the tip 22. The reel 16 is fixedly mounted on the handle section 14. The rod 12 is hollow forming an internal longitudinal chamber 24.

The rod 12 includes an outermost section 26. This outermost section 26 can either be translucent or transparent with generally the remaining portion of the rod 12 being neither. This outermost section 26 is capable of transmitting light. Embedded within the rod 12, by being located within the internal chamber 24, is a light source 28. Normally, the light source 28 will comprise a double filament incandescent bulb. But other light sources could be used without departing from the scope of this invention. In FIG. 5, the double filament bulb light source 28 is shown as two separate bulbs.

Embedded within the tip chamber 31 of the tip 22 is a movement-actuatable switch such as a mercury switch. The mercury switch is held in position by cap 33. A typical mercury switch utilizes a glass envelope 30 within which is located a bubble 32 of mercury. Mounted within the envelope 30 are contacts 34 and 36. When there is a forward-jerking motion imparted to the outermost section 26 by a force being applied to the line 18, the mercury bubble 32 will be moved against the contacts 34 and 36. Contact 34 is connected by wire 38 to light source 28 with contact 36 being connected by wire 40 to a positive battery wire 42. Positive battery wire 42 is electrically connected to the battery 44 which is shown to comprise a pair of in-line, penlight type of batteries 46 which are mounted within an internal chamber 48 formed within the handle 14. Access into the chamber 48 in order to replace the batteries 46 is permitted through removable cap 50 mounted in the back end of the handle section 14. Between cap 50 and the aft battery of batteries 46 is a spring 51.

From the battery 44 there is a conducting wire 52. This wire 52 connects to a three-position switch 54 which is fixedly secured on the exterior of the handle 14. The three-position switch 54 includes a movable button 56 which is always continuously in electrical connection with the wire 52. The button 56 is capable of occupying the off position, position A and position B. With the button 56 in the off position, there is no activation of the light source 28. With the button 56 in the B position, activation of the light source 28 is possible but only when the mercury bubble 32 connects between contacts 34 and 36. This will generally result in a blinking illumination of the light source 28 which generally would be desired to ascertain whether a fish is attempting to take the bait without imposing a continuous electrical drain on the battery 44. In this way, the outermost section 26 is illuminated only when it is needed to observe the fish attempting to take the bait.

However, the user does have the option of causing continuous illumination of the outermost section 26 which is to occur if the button 56 is located in position A. In position A, the circuit is directly connected to the light source 28 bypassing the mercury switch of the circuit.

What is claimed is:

1. A lighted fishing pole comprising:

a handle from which extends an elongated bendable rod having a lengthwise axis;

a fishing reel mounted on said handle with fishing line extending from said reel, said fishing line being mounted on and in juxtaposition to said bendable rod and then exteriorly of said bendable rod;

said bendable rod having an outermost section, said outermost section extending in the lengthwise direction along said lengthwise axis, said outermost section being of a length substantially less than the total length of said bendable rod, said outermost section being illuminatable, said outermost section terminating at a free end;

a light source embedded within said bendable rod and located at said outermost section, activation of said light source causes illumination of said outermost section;

a battery source of power mounted in said handle, a manually operated switch mounted on said handle, said manually operated switch controlling the activation of said light source by power from said battery source, said manually operated switch having three different positions with one position being off not activating said light source and a second position permitting activation of said light source and a third position causing continuous activation of said light source; and a movement actuatable switch mounted on said free end of said outermost section, said movement actuatable switch being embedded within said rod, said light source being connected to said movement actuatable switch, upon said movement actuatable switch sensing sufficient movement of said free end of said outermost section said light source is activated When said manually operated switch is in said second position.

2. The lighted fishing pole as defined in claim 1 wherein:

said outermost section being translucent.

3. The lighted fishing pole as defined in claim 1 wherein:

said outermost section being transparent.

* * * * *